Patented Jan. 26, 1937

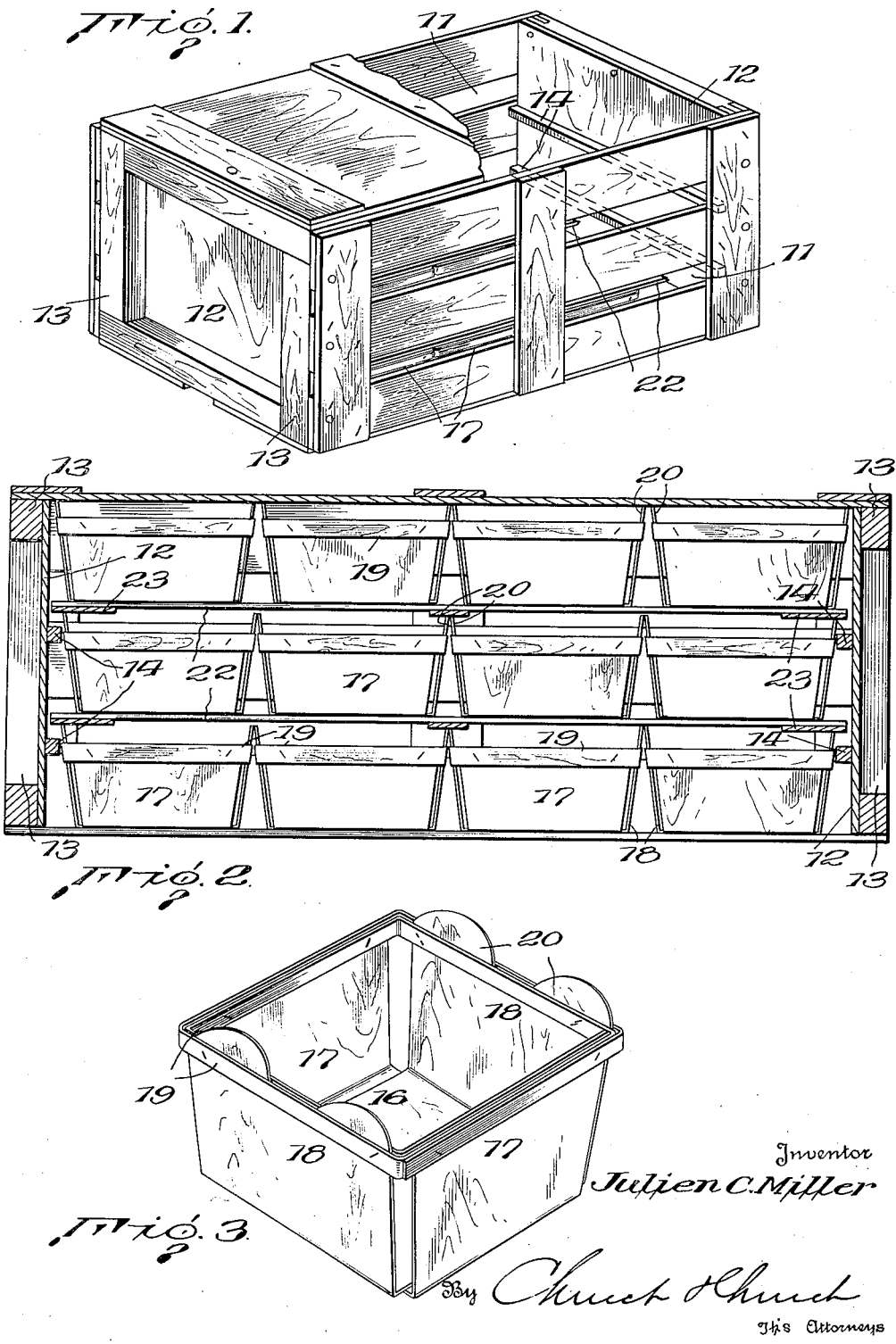

2,068,812

UNITED STATES PATENT OFFICE 2,068,812

SHIPPING CONTAINER

Julien C. Miller, Paducah, Ky., assignor to Paducah Box & Basket Co., Inc., Paducah, Ky., a corporation of Kentucky Application October 24, 1934, Serial No. 749,798

4 Claims. (Cl. 217—40)

This invention relates to improvements in containers, such as shipping crates and, particularly, a crate used for shipping a plurality of fruit receptacles or berry baskets. Primarily, the object of the invention is to provide a shipping crate, especially a crate used for shipping strawberries and like fruit, wherein all likelihood of the berries being damaged by being cut or bruised is eliminated.

Heretofore, in the shipment of fruit such as strawberries, and the like, it has been customary to place individual receptacles, either pint or quart baskets, in the crate, layer upon layer, with each layer spaced from the adjacent layer or layers by partition or divider members, the divider members each forming a support for the layer of baskets next above it. In a great many instances, these partitions or dividers have been provided with transverse ribs adapted to rest upon the rims of the layer of baskets immediately beneath the divider, the height of the ribs being such as to space the divider itself from the fruit in the baskets. Where such procedure is followed, the transverse ribs are not always maintained in position on the rims of the baskets but, on the contrary, due to a slight movement of the dividers, these ribs impinge upon, and bruise or cut, berries in the baskets. In accomplishing the principal object of this invention, i. e., protecting the fruit from bruising or cutting, the crate is provided with dividers or partition members that are supported on the baskets in such fashion as to prevent damage to the fruit regardless of movement of the dividers in a horizontal plane relatively of the baskets beneath them. More specifically, the invention contemplates berry baskets having projections at opposite sides thereof extending above the rim at the top of the baskets and divider members of such length or breadth as to extend beyond the extremities of the layer of baskets in a crate, so as to be firmly supported on the basket projections. The height of the projections above the basket rims is such as to afford the desired protection to the fruit in the baskets, and the projecting extremities of the divider members form extended bearing surfaces which prevent the extremities of the divider slipping off the projections of the baskets down into the baskets.

A further object of the invention is to secure this maximum protection for the fruit in crates which have closed end walls. There are certain conditions under which it is necessary for at least one end of a berry crate to be completely closed, and where such construction is necessary, it is proposed, in the present invention, to provide means for spacing the baskets from such imperforate end walls in order to provide ample space to accommodate the extended bearing surfaces of the dividers.

With these and other objects in view, the invention consists in certain details of construction and combinations and arrangements of parts, all as will hereinafter be more fully described, and the novel features thereof particularly pointed out in the appended claims.

In the accompanying drawing—

Figure 1 is a perspective view of a crate constructed in accordance with the present invention, a portion of the baskets being removed in order to illustrate the inner surface of a portion of one end wall;

Fig. 2 is a longitudinal vertical section through the crate in a plane just above one of the dividers, a portion of one end of the divider being broken away; and Fig. 3 is a perspective view of one of the individual baskets.

So far as the outside configuration of the crate is concerned, it is like the ordinary crate in common use today but, of course, its dimensions would depend upon the number and size of the individual receptacles or berry baskets that are to be packed therein. The major portion of the crate may also be of any desired construction, but preferably the sides are of slat construction to provide openings 11 for the ventilation of fruit in the baskets. These openings also permit inspection, to a certain extent, of the fruit.

As heretofore mentioned, it is sometimes required that one or both ends of the crate be solid or imperforate. This is usually for the purpose of providing an extended area on at least one side wall of the crate for the application of a label. In the present instance, both end walls 12 of the crate are shown as being solid, each being formed of an imperforate sheet of wood secured to the corner posts 13.

The berry baskets are preferably formed of two pieces of thin wood bent, as shown in Fig. 3, to form the bottom 16, the sides 17, and the ends 18, the ends 18 adjacent their upper extremities and the upper extremities of the sides 17 being reinforced or attached to strips of material 19, which constitute the rim of the basket. It will be observed that portions of the end members 18 project above the rim 19 and constitute projections 20 for a purpose which will hereinafter more fully appear.

The divider members are preferably formed of a plurality of strips or slats 22 secured to cross members 23, although other types of dividers may be used, if desired.

When packing the baskets in the crate, they are disposed therein in superposed layers, with a divider member interposed between each two contiguous layers, as shown in Figs. 1 and 2. It will be observed that the projections 20 on the baskets of one layer support the divider immediately above it and the baskets that rest on said divider. It will also be noted that the height of the projections 20 is such as to absolutely preclude any portion of the divider coming into contact with the berries in the layer of baskets beneath it. The thickness of cross pieces 23 of the dividers is immaterial. In other words, the projections fully protect the berries. By having the dividers and the baskets above each divider supported on the baskets below each divider, all the baskets are securely held in place in the crate so that they cannot shift around during transportation or handling.

It is, of course, necessary that the dividers each be of somewhat smaller dimensions than the interior dimensions of the crate, in order to facilitate their placement therein. Hence, it is possible that they may shift a little from their original positions, under which circumstances, it is entirely possible for the ends thereof to be displaced inwardly from one of the end rows of baskets and thus injure the fruit in those particular baskets. For this reason, the dividers are adapted to project a considerable distance beyond the baskets at two extremities of each layer of baskets, so as to form or constitute what might be termed extended bearing surfaces to be engaged on the projections of the baskets at the corresponding extremities of the layer. In the ordinary crate having openings at its ends, the projecting ends of the dividers or these extended bearing surfaces, as they have been termed, could project through such openings. However, this is not possible where the crate has imperforate walls as in the present construction. Therefore, the inner surfaces of said solid walls are provided with means for holding the baskets in spaced relation thereto. For instance, as shown in the present construction, where the end walls are solid, the inner surfaces of said end walls are provided with ribs 14 against which the end baskets abut, the width of these ribs being such as to provide ample space between the baskets and the end walls to accommodate the overhanging ends or so-called bearing surfaces of the dividers. Preferably, these ribs are formed of strips of wood secured by suitable means to the end walls, but it will be understood that other forms of construction can be used, so far as these spacer members are concerned. Likewise, it is not essential that the end walls be the closed walls. In other words, in its broadest aspect, the invention contemplates a crate for berry baskets having one or more solid walls with spacer means extending transversely thereof, against which the berry baskets abut, these spacer means thus providing a space to accommodate the extremities of a divider member that is usually interposed between two superposed layers of baskets in the crate.

What is claimed is:

1. In combination, a shipping crate for fruit receptacles such as berry baskets, said crate having side and end walls, baskets adapted to be arranged in two superposed layers in said crate, vertical projections extending above the rims of the baskets, a divider member interposed between said superposed layers, said divider and the baskets resting thereon being supported by the projections of the baskets immediately below said divider, and means holding the basket projections spaced from two opposite walls of said crate, two extremities of said divider extending beyond the projections of the layer of baskets beneath it into the space formed by said spacing means, the length of the said extending portions of the divider exceeding the distance between said two extremities of the divider and the corresponding wall of the crate whereby accidental displacement of said divider extremities inwardly of the baskets is prevented.

2. In combination, a shipping crate for fruit receptacles such as berry baskets, said crate having side and end walls, baskets adapted to be arranged in two superposed layers in said crate, projections extending above the rims of each of said baskets, vertically spaced transverse ribs on the interior of two opposite walls of the crate engaging against the baskets to hold said baskets spaced from said two opposite walls, and a divider interposed between said two layers of baskets, two extremities of said divider constituting extended surfaces for engagement on the projections of the baskets beneath it, said extended surfaces being accommodated by the space provided between the baskets and said two opposite walls by said ribs, the portions of said dividers positioned in said spaces being of a length greater than the distance between said two extremities of the divider and said two opposite walls.

3. In combination, a shipping crate for fruit receptacles such as berry baskets, said crate having side and end walls, two opposite walls being imperforate, baskets arranged in two superposed layers in said crate, projections extending above the rim of each basket, means on said imperforate walls for holding the baskets spaced from said walls, and a divider interposed between said two layers of baskets, said divider being supported on the projections of the baskets beneath it, two extremities of said divider projecting an appreciable distance into the space between the baskets and said opposite walls, the length of said projecting portions of the divider exceeding the space between said two extremities of the divider and the corresponding walls of the crate, the projecting portions of said divider constituting extended bearing surfaces whereby accidental displacement of said divider extremities inwardly of the baskets is prevented.

4. In combination, a shipping crate for fruit receptacles such as berry baskets, said crate having side and end walls, two opposite walls being imperforate, baskets adapted to be arranged in two superposed layers in said crate, projections extending above the rims of said baskets, spacer strips extending transversely of said imperforate walls for holding the baskets spaced from said imperforate walls, and a divider interposed between said layers of baskets and supported on the projections of the baskets beneath it, two extremities of the divider protruding beyond the baskets toward said imperforate walls, said protruding extremities constituting extended bearing surfaces for projections of the baskets beneath the divider, the length of the protruding portions of the divider exceeding the distance between said two extremities of the divider and the corresponding walls of the crate whereby accidental displacement of said extremities inwardly of the baskets is prevented.

JULIEN C. MILLER.